United States Patent
Samuni et al.

(10) Patent No.: US 11,457,029 B2
(45) Date of Patent: Sep. 27, 2022

(54) LOG ANALYSIS BASED ON USER ACTIVITY VOLUME

(71) Applicant: Hewlett Packard Enterprise Development LP, Houston, TX (US)

(72) Inventors: Eran Samuni, Yehud (IL); Daniel Adrian, Yehud (IL); Yohay Golan, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 1073 days.

(21) Appl. No.: 15/033,144

(22) PCT Filed: Dec. 14, 2013

(86) PCT No.: PCT/US2013/075194
§ 371 (c)(1),
(2) Date: Apr. 29, 2016

(65) Prior Publication Data
US 2017/0013003 A1  Jan. 12, 2017

(51) Int. Cl.
*H04L 29/06* (2006.01)
*H04L 9/40* (2022.01)
*G06F 11/00* (2006.01)

(52) U.S. Cl.
CPC .......... *H04L 63/1425* (2013.01); *G06F 11/00* (2013.01)

(58) Field of Classification Search
CPC ............. H04L 63/1425; H04L 63/1408; H04L 63/1416
See application file for complete search history.

(56) References Cited

U.S. PATENT DOCUMENTS

| 5,847,972 | A | 12/1998 | Eick et al. | |
| 8,209,567 | B2* | 6/2012 | Cohen | G06F 11/3476 714/45 |
| 2004/0250169 | A1* | 12/2004 | Takemori | H04L 63/1425 714/38.1 |
| 2005/0198099 | A1* | 9/2005 | Motsinger | G06F 21/55 709/200 |
| 2009/0007266 | A1* | 1/2009 | Wu | H04L 63/1458 726/22 |
| 2009/0292742 | A1 | 11/2009 | Morgan et al. | |
| 2011/0023120 | A1* | 1/2011 | Dai | G06F 21/56 726/23 |

(Continued)

FOREIGN PATENT DOCUMENTS

EP    2454684 A1    5/2012

OTHER PUBLICATIONS

IBM Software. IBM Security QRadar Network Anomaly Detection. http://www-03.IBM.com/software/products/en/qradar-network-anomaly-detection/.

(Continued)

*Primary Examiner* — Saleh Najjar
*Assistant Examiner* — Devin E Almeida
(74) *Attorney, Agent, or Firm* — Sheridan Ross P.C.

(57) ABSTRACT

In one example implementation, a log analysis system can comprise an activity engine to monitor user activity of a computer system, a baseline engine to generate an expected baseline of a log, and an abnormality engine to compare the log to the expected baseline to identify an abnormality, compare the abnormality to a user activity volume based on a correlation between the user activity volume and the log activity, and classify the log.

20 Claims, 5 Drawing Sheets

(56) References Cited

U.S. PATENT DOCUMENTS

| | | | |
|---|---|---|---|
| 2012/0016886 A1* | 1/2012 | Cohen | G06F 17/18 707/748 |
| 2013/0060385 A1 | 3/2013 | Leen et al. | |
| 2013/0305357 A1* | 11/2013 | Ayyagari | H04W 12/06 726/22 |
| 2014/0053261 A1* | 2/2014 | Gupta | G06F 21/55 726/22 |
| 2014/0189098 A1* | 7/2014 | MaGill | G06F 21/604 709/224 |
| 2014/0298461 A1* | 10/2014 | Hohndel | G06F 21/554 726/23 |
| 2015/0101048 A1* | 4/2015 | Sridhara | G06F 21/55 726/23 |
| 2015/0372977 A1* | 12/2015 | Yin | H04L 63/0272 726/1 |

OTHER PUBLICATIONS

Mann, V. et al., "Correlating User Activity With System Data for Fast Detection and Diagnosis of System Outages", (Research Paper), Aug. 10, 2011, 12 pages.

Matsubara, Y. et al., "Development of a Desktop Search System Using Correlation Between User's Schedule and Data in a Computer", (Research Paper), Aug. 17, 2007, pp. 235-238.

Oliner, A. et al., "Advances and Challenges in Log Analysis", (Research Paper), Dec. 20, 2011, 11 pages.

Park, et al. User Application Monitoring through Assessment of Abnormal Behaviours Recorded in AS Logs. Cray User Group 2011. https:/cug.org/5-publications/proceedings_attendee_lists/CUG11CD/pages/1-program/final_program/Monday/04B-Park-Paper.pdf.

* cited by examiner

LOG ANALYSIS BASED ON USER ACTIVITY VOLUME

BACKGROUND

Computer systems commonly generate messages associated with system events. These messages can be stored in a file and are commonly referred to as "logs." Logs can be used to analyze the health of the computer system, including software operating on the computer system. For example, logs can be used for software or system development, such as debugging, or in computer system maintenance, such as troubleshooting. Logs commonly contain a variety of information. For example, messages can be associated with system errors or regular health checks. Systems commonly produce relatively large amounts of messages and logs. For example, a system can produce thousands of event messages per second. Great effort can be exerted to sift through such logs to locate and interpret relevant information appropriately. For example, a relatively large log file does not necessarily indicate a problem with the system.

DETAILED DESCRIPTION

In the following description and figures, some example implementations of log analysis systems and/or methods for analyzing a log are described. As mentioned, logs contain event messages that can describe actions, warnings, errors, or other states experienced by a computer system. Logs can be analyzed to identify an abnormality. The abnormality can be related to a bug or a system problem. For example, a log can store errors generated as a bug appears in software or system development. An increase in messages, or log entries, can indicate that a recent update in the software or system can have a bug. However, if a quantity of messages indicates an abnormality, a false indication that an abnormality exists in a log can appear when the increase in log entries is due to user activity volume.

Various examples described below relate to analyzing a log based on user activity volume. User activity can be monitored and associated with a log and the abnormality determination can consider the volume of user activity at the time the entries of the logs are generated. By adjusting log analysis in accordance with user activity volume, false indication of abnormalities can be reduced.

Figure 2:
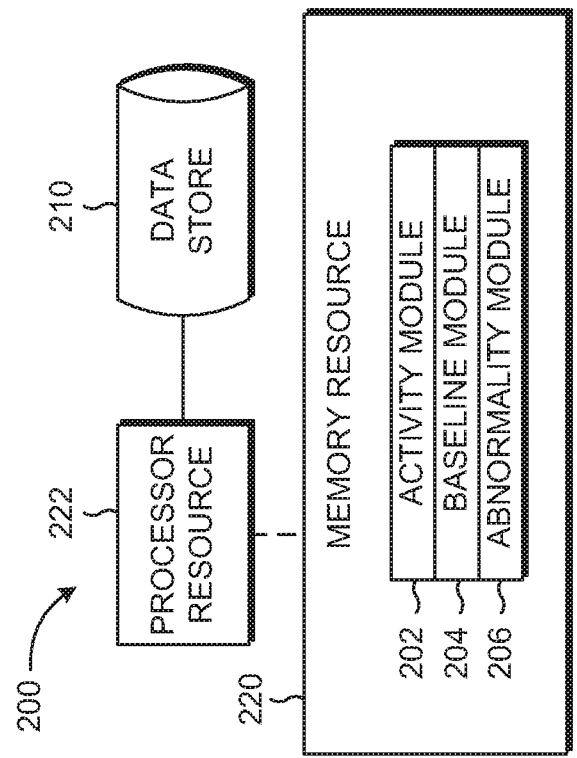
FIGS. 1 and 2 are block diagrams depicting example log analysis systems.
Figure 1:
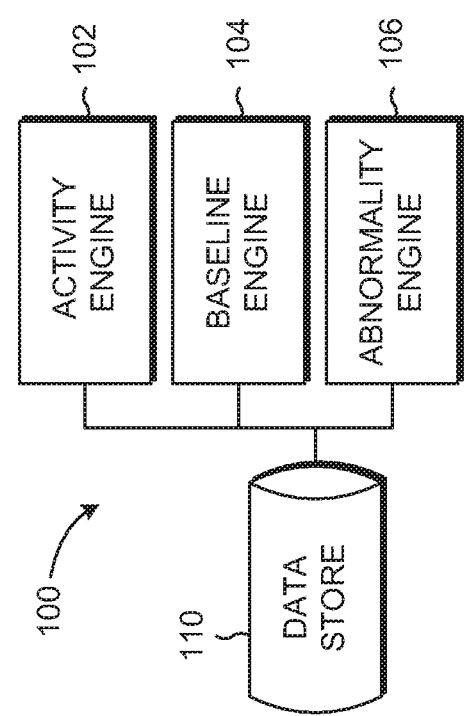

FIGS. 1 and 2 are block diagrams depicting an example log analysis systems 100. Referring to FIG. 1, an example log analysis system 100 generally comprises an activity engine 102, a baseline engine 104, and an abnormality engine 106. In general, the abnormality engine 106 can compare a user activity volume identified by the activity engine 102 to an expected baseline 104 to determine a user activity volume correlation and use the user activity volume correlation to classify an abnormality of the log based on the user activity volume. The example log analysis system 100 can also include a data store 110. The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based only on the stimulus or a combination of stimuli including the stimulus.

The activity engine 102 represents any combination of circuitry and executable instructions to monitor user activity of a computer system. The number of users can be monitored by tracking requests and/or the sources of the requests. The activity engine 102 can monitor the volume of user activity and other data related to the user activity volume. For example, a monitor can be a real user monitor that determines the number of real users interacting with the system at any given time. A real user monitor can manage the real user's experience with the computer system by providing visibility to the transaction and behavior, such as response time. As the users interact with the computer system, the computer system can generate event messages and logs.

The baseline engine 104 represents any combination of circuitry and executable instructions to generate an expected baseline of log activity. The expected baseline can be the number of messages expected to be produced by the computer system at a given time. For example, regularly scheduled health checks on the computer system can be expected during a time period of analysis of the computer systems health, and event messages related to the health checks would be expected to be found in the logs at the scheduled intervals. The expected baseline can be generated using data related to the computer system, such as historical log data at the associated time or system test data. The expected baseline can be continuously updated, dynamically updated, or updated based on a schedule.

The baseline engine 104 can include a template engine and a seasonality engine. The template engine represents any combination of circuitry and executable instructions configured to identify a log template based on a log entry, and the seasonality engine represents any combination of circuitry and executable instructions configured to determine a time-dependent pattern of event messages in the log. The attributes and operations of the template engine and seasonality engine are as discussed in more detail in the description of the template module 440 and the seasonality module 442 of FIG. 4.

The abnormality engine 106 represents any combination of circuitry and executable instructions to identify an abnormality in a log associated with the computer system and classify the abnormality. For example, the quantity of event messages of a log can be graphed and compared to a graph of the expected baseline of event messages to identify an abnormality, and if the quantity of event messages is severely different from the expected baseline, the abnormality can be given a severe classification, such as a score representing an important abnormality. The abnormality can be determined based on quantity or variation with reference to a user activity volume. For example, the expected baseline and the log can be graphed and the difference between the graphs can be compared to a graph of user activity volume. The user activity volume can be calculated or retrieved from data monitored by the activity engine 102. The effect of the user activity volume can be removed once a potential abnormality is identified. For example, a potential abnormality and an associated user activity volume can be compared to identify the potential abnormality is related to the user activity volume at the time of the abnormality.

The abnormality engine 106, in conjunction with the baseline engine 104, can produce a baseline graph based on the expected baseline of event messages for the log and the abnormality engine 106. For example, the abnormality engine 106 can create a graph of message clusters (log templates) based on the count of log entries associated with message cluster type which can show the relationship between cluster frequencies in the log. The abnormality engine 106, in conjunction with the activity engine 102, can create a graph based on the user activity volume at the time of the event messages. The graphs can be compared to determine a correlation between the user activity volume and the expected baseline. The abnormality engine 106 can compare the baseline graph to the graph created based on the actual count of event messages of the log. For example, the baseline engine 104 can produce a graph showing, based on normalized user activity volume, thousands of messages associated with a system login log template, thousands of messages associated with a processing request log template, and only hundreds of messages associated with data retrieval log template and the actual counts of messages of the log can show that, in fact, thousands of messages associated with the data retrieval log template should have been produced. In that example, the difference between the graphs would show a potential abnormality of data retrieval based on the difference between the graphs.

The baseline graph produced by the abnormality engine 106 may have a correlation with user activity volume. The correlation represents a relationship between the user activity volume and the log. For example, the computer system can know that a data access message occurs when a user obtains authorization and produce a baseline graph showing three hundred messages during a ten minute period because the real users logging into the computer system during the ten minute period was three hundred. In that example, if no data access messages were produced during that ten minute period when three hundred were expected, then that may indicate a problem with the database (e.g. an example abnormality as discussed herein). The abnormality engine 106 can compare the abnormality to the user activity volume at the time of the abnormality and determine a correlation between the user activity volume and the log activity. The correlation can be determined by comparing the graph of the expected baseline and the user activity volume at the time of the expected baseline and/or based on other data retrieved from the activity engine 102 associated with user activity. The graphs can be compared using data provided by a real user monitor to determine a correlation with the user activity. The correlation can be a linear correlation between the user activity and the expected baseline.

The abnormality engine 106 can classify the log based on the abnormality, the correlation, and the user activity volume. For example, if a message type is directly related to user activity volume, and one hundred users are active and only twenty event messages are produced, an abnormality may exist and classified as high based on the variation from the correlation. The abnormality can be scored based on the correlation and the difference between the first graph and the log activity, such as abnormalities with direct correlations to user activity volume higher scores than abnormalities without direct correlations to user activity volume. The abnormality engine 106 can generate a degree of abnormality based on a context of the log and a severity of the abnormality. For example, the degree of difference between a baseline graph and an actual log graph can be small, but the type of abnormality can be highly severe based on the correlation with user activity volume. The context of the log can include the user activity correlation of the log based on the degree of user volume on the log. The degree of severity and/or degree of difference can be represented as a percentage, a number, a category, and/or other label capable of expression of level or degree of the attribute.

The data store 110 can store data used by or otherwise associated with the system 100. Specifically, the data store 110 can store data used or produced by the activity engine 102, the baseline engine 104, and the abnormality engine 106. For example, the data store 110 can include data associated with user activity, log files, log templates, graphs, etc.

FIG. 2 depicts the example log analysis system 200 can be implemented on a memory resource 220 operatively coupled to a processor resource 222. The processor resources 222 can be operatively coupled to a data store 210. The data store 210 can be the same as the data store 110 of FIG. 1.

Referring to FIG. 2, the memory resource 220 can contain a set of instructions that can be executable by the processor resource 222. The set of instructions can implement the system 200 when executed by the processor resource 222. The set of instructions stored on the memory resource 220 can be represented as an activity module 202, a baseline module 204, and an abnormality module 206. The processor resource 222 can carry out the set of instructions to execute the activity module 202, the baseline module 204, the abnormality module 206, and/or any appropriate operations among or associated with the modules of the system 200. For example, the processor resource 222 can carry out a set of instructions to generate a first graph of an expected baseline of log activity of a computer system, generate a second graph of user activity volume, compare the first graph and the second graph to identify a correlation between the expected baseline and the user activity volume, and score the log activity based on the expected baseline, the correlation, and the user activity volume. The activity module 202, the baseline module 204, and the abnormality module 206 represent program instructions that when executed function as the activity engine 102, the baseline engine 104, and the abnormality engine 106 of FIG. 1, respectively.

The processor resource 222 can be one or multiple central processing units ("CPU") capable of retrieving instructions from the memory resource 220 and executing those instructions. The processor resource 222 can process the instructions serially, concurrently, or in partial concurrence, unless described otherwise herein.

The memory resource 220 and the data store 210 represent a medium to store data utilized by the system 200. The medium can be any non-transitory medium or combination of non-transitory mediums able to electronically store data and/or capable of storing the modules of the system 200 and/or data used by the system 200. For example, the medium can be a storage medium, which is distinct from a transmission medium, such as a signal. The medium can be machine readable, such as computer readable. The data of the data store 210 can include representations of data and/or information mentioned herein, such as a log file, user activity, plurality of templates, graph data, etc.

In the discussion herein, the engines 102, 104, and 106 of FIG. 1 and the modules 202, 204, and 206 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The processor resource 222, for example, can include one or multiple processors. Such multiple processors can be integrated in a single device or distributed across devices. The memory resource 220 can be said to store program instructions that when executed by the processor resource 222 implements the system 200 in FIG. 2. The memory resource 220 can be integrated in the same device as the processor resource 222 or it can be separate but accessible to that device and the processor resource 222. The memory resource 220 can be distributed across devices. The memory resource 220 and the data store 210 can represent the same physical medium unless otherwise described herein.

Figure 3:
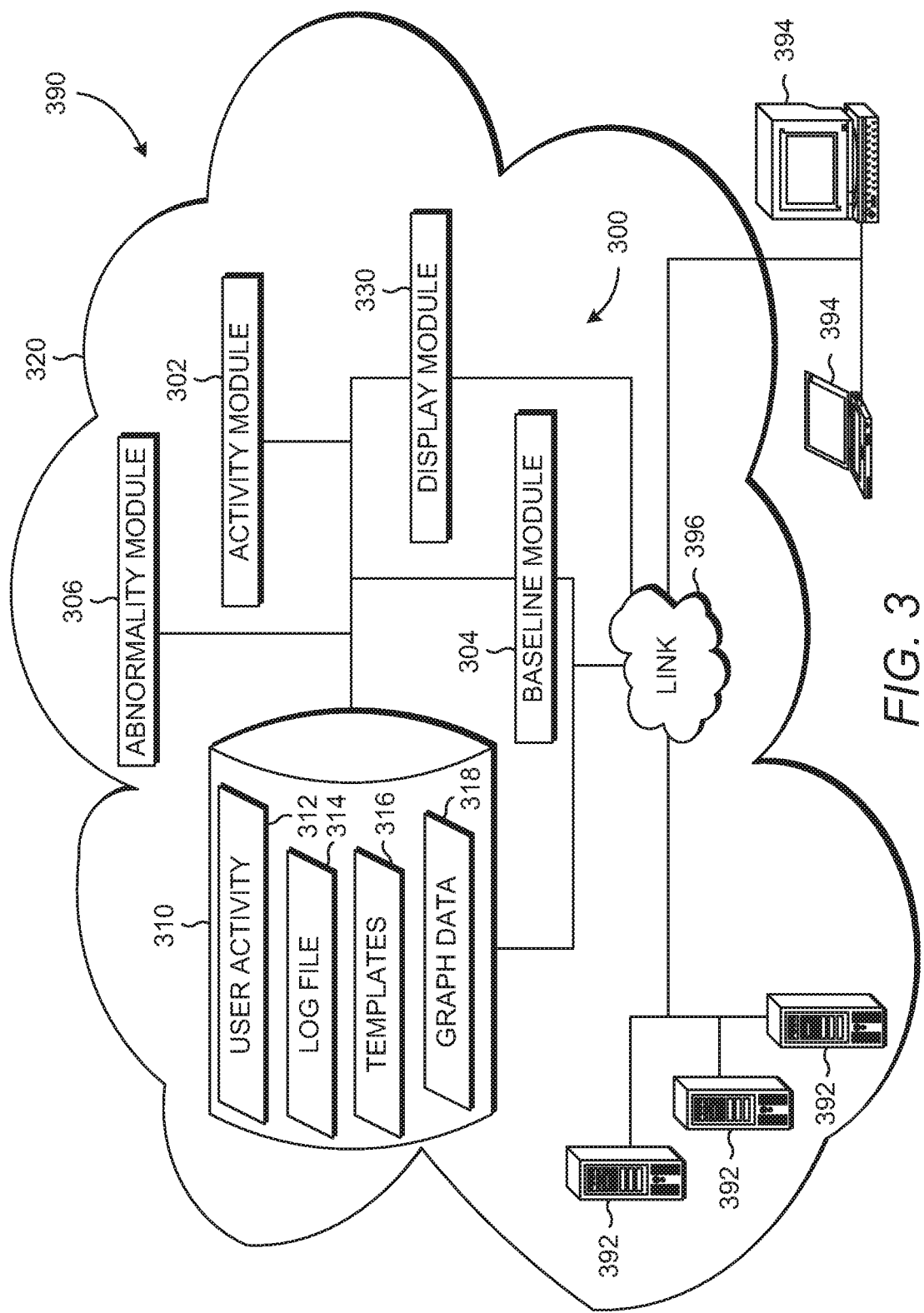
FIG. 3 depicts example environments in which various example log analysis systems can be implemented.

In one example, the executable instructions can be part of an installation package that when installed can be executed by processor resource 222 to implement the system 200. In that example, the memory resource 220 can be a portable medium such as a CD, a DVD, a flash drive, or memory maintained by a computer device, such as server device 392 of FIG. 3, from which the installation package can be downloaded and installed. In another example, the executable instructions can be part of an application or applications already installed. Here, the memory resource 220 can include integrated memory such as a hard drive, solid state drive, or the like FIG. 3 depicts example environments in which various example log analysis systems 300 can be implemented. The example environment 390 is shown to include an example log analysis system 300. The system 300 (described herein with respect to FIGS. 1 and 2) can represent generally any combination of circuitry and executable instructions configured to analyze a log. The system 300 can include an activity module 302, a baseline module 304, and an abnormality module 306, and a data store 310 that are the same as the activity module 202, the baseline module 204, the abnormality module 206, and the data store 210 of FIG. 2, respectively, and, for brevity, the associated descriptions are not repeated.

The example system 300 of FIG. 3 also includes a display module 330. The display module 330 represents program instructions that when executed represent a combination of circuitry and executable instructions configured to cause a display of an abnormality. For example, the display module 330 can create a webpage to present the abnormality of the log. The display module 330 can cause a display of the log activity of a log with an identifier associated with the abnormality and a classification of the log. For example, the identifier can be related to an abnormality score of the log, which can be based on a degree of severity of the abnormality and/or the importance of the event messages of the log. For another example, the display module 330 can display a log status correlation based on the abnormality and user activity volume, where the log status correlation represents a degree of correlation between the detected abnormality of the log and user activity volume.

The data associated with the system 300 can be stored in the data store 310. For example, the data store 310 can store user activity 312, a log file 314, a plurality of templates 316, and a set of graph data 318. The data store 310 can be accessible by the modules 302, 304, 306, and 330 to maintain data associated with the system 300.

The example system 300 can be integrated into a server device 392 or a client device 394. The system 300 can be distributed across server devices 392, client devices 394, or a combination of server devices 392 and client devices 394. The environment 390 can include a cloud computing environment, such as cloud network 320. For example, any appropriate combination of the system 300, server devices 392, and client devices 394 can be a virtual instance and/or can reside and/or execute on a virtual shared pool of resources described as a "cloud." The cloud network 320 can include any number of clouds.

In the example of FIG. 3, a client device 394 can access a server device 392. The server devices 392 represent generally any computing devices configured to respond to a network request received from the client device 394. For example, a server device 392 can be a virtual machine of the cloud network 320 providing a service and the client device 394 can be a computing device configured to access the cloud network 320 and receive and/or communicate with the service. A server device 392 can include a webserver, an application server, or a data server, for example. The client devices 394 represent generally any computing devices configured with a browser or other application to communicate such requests and receive and/or process the corresponding responses. A link 396 represents generally one or any combination of a cable, wireless, fiber optic, or remote connections via a telecommunications link, an infrared link, a radio frequency link or any other connectors of systems that provide electronic communication. The link 396 can include, at least in part, intranet, the Internet, or a combination of both. The link 396 can also include intermediate proxies, routers, switches, load balancers, and the like.

Referring to FIGS. 1-3, the engines 102, 104, and 106 of FIG. 1 and/or the modules 202, 204, and 206 of FIG. 2 (represented as modules 302, 304, and 306 of FIG. 3) can be distributed across server devices 392, client devices 394, other devices or storage mediums, or a combination thereof. The engines and/or modules can complete or assist completion of operations performed in describing another engine and/or module. For example, the abnormality module 306 of FIG. 3 can request and/or complete the operations and/or perform the methods of the abnormality module 306 as well as the activity module 302, the baseline module 304, and the graph module 308. The engines and/or modules can perform the example methods described in connection with FIGS. 4-6.

Figure 4:
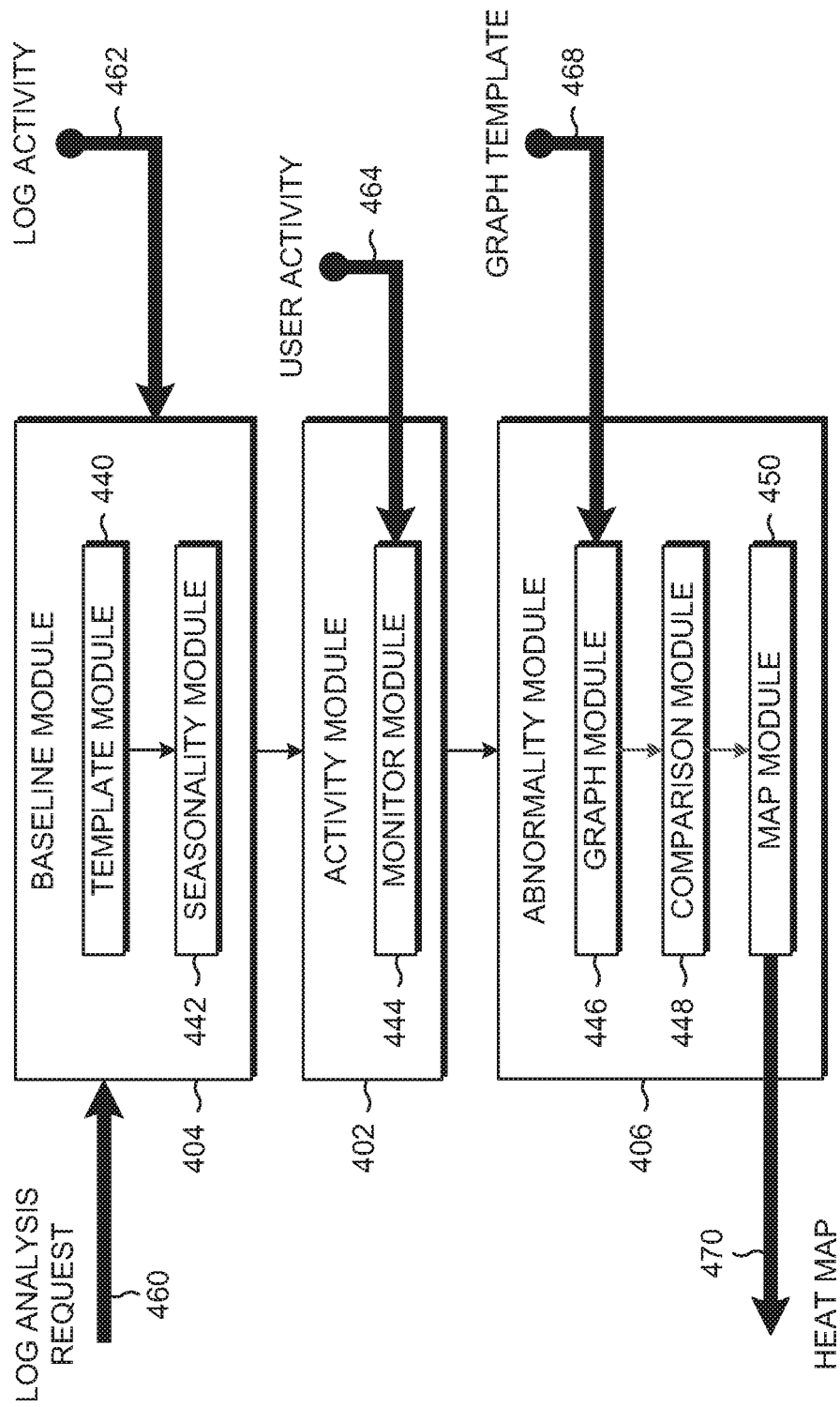
FIG. 4 depicts example modules used to implement example log analysis systems.

FIG. 4 depicts example modules used to implement example log analysis systems. The example modules of FIG. 4 generally include an activity module 402, a baseline module 404, and an abnormality module 406, which can be the same as the activity module 202, the baseline module 204, and the abnormality module of 206 of FIG. 2. As depicted in FIG. 4, the example modules can also include a template module 440, a seasonality module 442, a monitor module 444, a graph module 446, a comparison module 448, and a map module 450.

Referring to FIG. 4, the baseline module 404 can receive a log analysis request 460. The baseline module 404 can be the same as the baseline module 204 of FIG. 2. The baseline module 404 can generate an expected baseline of log entries to compare to actual log activity 462. The baseline module 404 can use a template module 440 and/or a seasonality module 442 to determine the expected baseline. For example, the expected baseline can be based on counts of log entries associated with various log templates and a seasonality effect determined based on the time of the log entries being analyzed. The baseline module 404 produces the expected baseline to be used by the abnormality module 406.

The template module 440 represents program instructions that when executed function as a combination of circuitry and executable instructions configured to determine a log template based on a log file. For example, the template module 440 can organize the log entries of a log file into a plurality of templates. The abnormality module 406 can use the log templates to compare a number of messages expected of the log template in the baseline to a number of actually entered messages in the log file associated with the log template. A log template represents a type of event message of the log. The event messages of a log can be related and/or similar to a log template and, as such, can be grouped together. The log template can be based on a text template for identifying the structure of the text of the message, such as a regular expression. For example, event messages of the log can have a first text template can describe a first group as having an event message that begins with "error processing request from" while a second text template can describe a second group having an event message that begins with "unable to retrieve data from." The expected baseline can comprise a degree of relatedness among log activity based on a text template. For example, the messages can vary on a word or number or an entire phrase, and the messages associated with the log template can have a degree of relatedness accordingly.

The seasonality module 442 represents program instructions that when executed function as a combination of circuitry and executable instructions configured to determine a seasonal effect on the log file. For example, the event messages can increase at a specific time of day. The expected baseline of log activity of a computer system can be generated based on a seasonal effect. The seasonal effect is a relationship between time and/or state of the computer system and the event messages of a log. The seasonal effect can be determined based on a time-dependent pattern of messages in the log. For example, regularly scheduled updates can show an increase in messages at the time of the scheduled updates. The seasonal effect can be associated with a log template. For example, the event messages associated with data retrieval template messages can increase at a specific time of day. The abnormality module 406 can use the seasonal effect to determine a change in the log that has not been seen before at that time. For example, the increase in event messages of a log template type can seasonally increase in the morning and an above-average amount of event messages of the log template in the afternoon can be an abnormality, where the same set of messages in the morning would likely not be considered an abnormality because it would be expected based on the seasonal effect. The seasonal effect, once determined, can be normalized by the user activity volume. For example, the expected baseline can be adjusted with respect to a seasonal effect as well as the effect of user activity volume on the seasonal effect.

The activity module 402 can be the same as activity module 202 of FIG. 2. The activity module 402 can include a monitor module 444. The monitor module 444 represents program instructions that when executed function as a combination of circuitry and executable instructions configured to monitor user activity 464 of the system. The activity module 402 can determine the user volume based on the user activity 464 during the time period for analysis of the expected baseline. The activity module 402 can provide the volume of user activity 464 to the abnormality module 406.

The abnormality module 406 can be the same as abnormality module 206 of FIG. 2. The abnormality module 406 can determine an abnormality by comparing an expected baseline, the user activity volume, and the actual log activity 462. For example, an abnormality can be the difference between the expected baseline and the actual log activity 462 that achieves an abnormality threshold. The abnormality threshold can be a difference in value, such as a percentage or ratio, based on the expected baseline. For example, the abnormality threshold can be five percent of the expected baseline value. The abnormality module can compare the volume of user activity 464 to the abnormalities between the expected baseline and the actual log activity 462. The abnormality module 446 can utilize the comparison module 448 described below. The abnormality module 446 can take into account the volume of user activity 464 in determining a potential abnormality. For example, if the expected baseline has not been adjusted based on the user activity volume, the abnormality can verify a potential abnormality when the potential abnormality does not correlate with the volume of user activity at the time of the abnormality.

The abnormality module 406 can use a graph module 446 to convert the log activity 462 to a graph. The graph module 446 represents program instructions that when executed function as a combination of circuitry and executable instructions configured to generate a graph based on the log activity 462.

The comparison module 448 represents program instructions that when executed function as a combination of circuitry and executable instructions configured to compare the log activity to the expected baseline based on the user activity volume. For example, the expected baseline can be converted to a graph and compared to the graph of the log activity 462. The differences between the expected baseline graph and the log activity graph can be potential abnormalities. The comparison module 448 can use the volume of user activity 464 to verify the potential abnormalities. For example, the comparison module 448 can use a graph of the volume of user activity to compare to other graphs generated by the comparison module 448 or other module of the system. The comparison module 448 may determine a correlation function to express the relationship between user activity volume and the log activity. For example, an increase in user activity volume may have a one-to-one increase in log activity or the correlation can be that the user activity volume should have no effect on the analyzed log activity.

The map module 450 represents program instructions that when executed function as a combination of circuitry and executable instructions configured to provide structure to form a map of the log. For example, the abnormalities (such as the potential abnormalities) can be placed in a structure showing the relationship between the volume of user activity and the abnormalities. The structure produced by the map module 450 can be used to produce a heat map 470 showing the status of the log. The structure can be used to display a map of logs and the health score of each log. For example, the map module 450 can provide a structure to display a log that has an abnormality as red, and the log template in the log that contains the abnormality as red to indicate a low health, where a log without an abnormality can be indicated as healthy using the color green. The structure can include various statuses based on correlation with user activity volume and/or importance of the event messages of the log. For example, each node of the map can be scored based on potential abnormality, correlation with user activity, and importance of the message of the log template.

Figure 5:
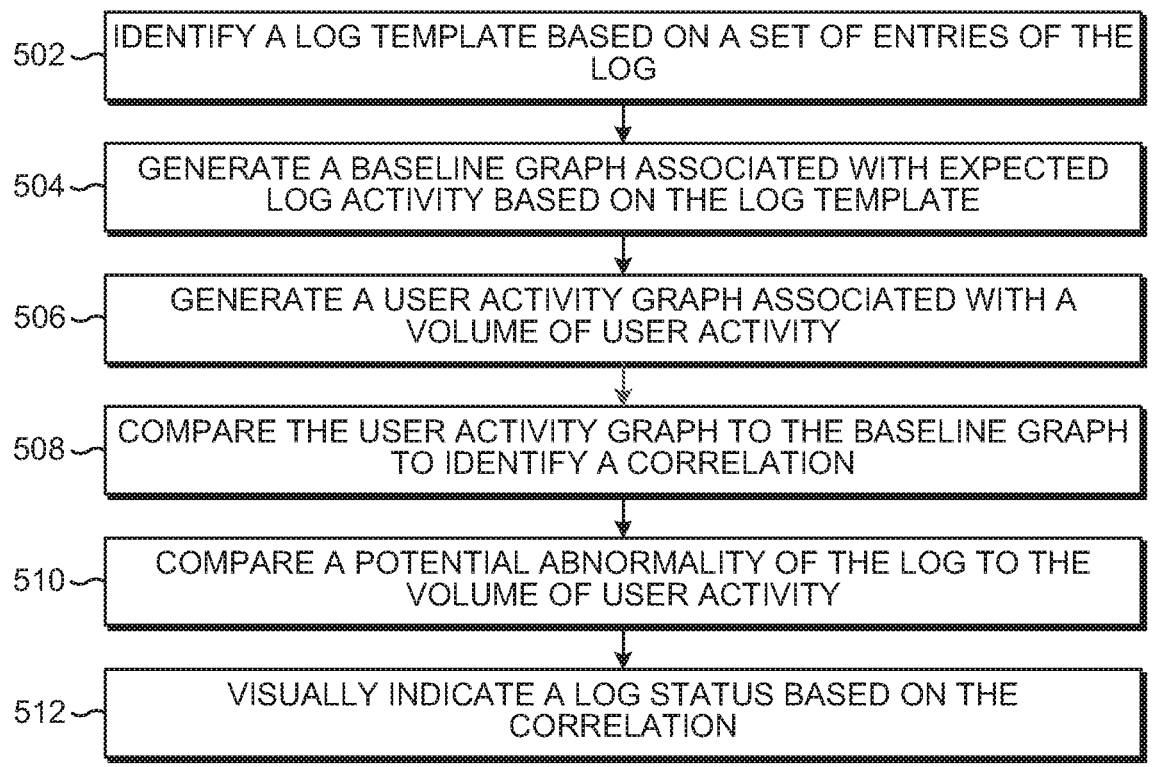
FIGS. 5 and 6 are flow diagrams depicting example methods for analyzing a log.
Figure 6:
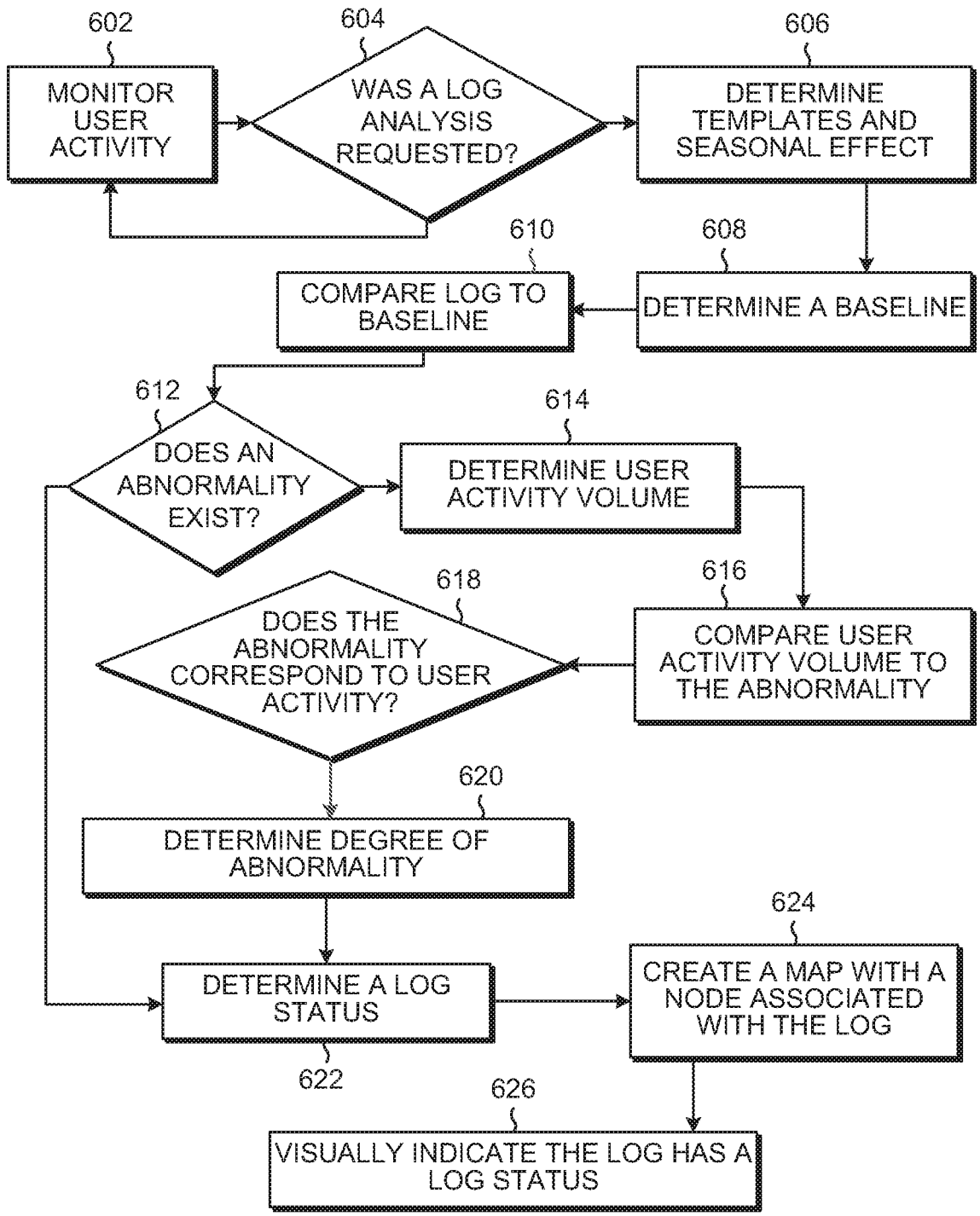

FIGS. 5 and 6 are flow diagrams depicting example methods for analyzing a log. Referring to FIG. 5, example methods for analyzing a log can generally comprise identifying a log template, generating a baseline graph, generating a user activity graph, comparing a potential abnormality of the log to user activity volume, and visually indicating a log status.

At block 502, a log template is identified based on a set of entries of the log. For example, template data can be used to determine the types of log templates of the log. A log file can be analyzed to determine that the event messages can be organized into a plurality of clusters (log templates) based on the text of the event messages, such as represented by a text template. The log file can contain multiple log entries and each log entry can be associated with a log template, each log file can contain multiple log templates, and each cluster can track the number of log entries associated with the text template. The log template is used to generate a baseline graph associated with expected log activity at block 504. In particular, a baseline can be determined based on a log template, where the log template can be associated with template data, such as historical data or seasonality data, to determine how many of an event message could be expected. For example, the log can be represented as a graph of each log template where the count of the log template is mapped to a log graph based on the number of the set of entries associated with the log template.

At block 506, a user activity graph is generated based on the volume of user activity. The user activity graph is compared to the baseline graph at block 508. The difference between the user activity graph and the baseline graph can identify a correlation. At block 510, a volume of user activity is compared to a potential abnormality between the log and the baseline. For example, the difference between the log graph and the baseline graph during a time interval around a software update can be compared to the graph of user activity volume during the time interval. The difference between the log activity and the baseline could be attributable to user activity volume, which would be apparent if the fluctuation in the abnormality of the log changed with the fluctuation of user activity volume. For example, it would be expected that a similar correlation between user activity volume would exist between historical log data and current log data, and if the correlation between the current log activity and user activity volume is different from the correlation between the historical log activity and user activity volume at the time of the potential abnormality, the potential abnormality can be verified as an abnormality. The abnormality can be obtained from a log, based on the baseline, and the volume of user activity at the time of abnormality can be obtained from a monitor, such as a real user monitor.

At block 512, a log status is visually indicated based on the potential abnormality and the volume of user activity. Any identifier capable of indicating log status can be used. For example, an identifier can be a color, a number, or a label. The identifier can indicate the type of abnormality, the degree of abnormality, and/or the user activity volume. Visual indication of an abnormality of a log is important when laboring through thousands of logs for ready indication of where troubleshooting efforts could be directed. A map can be created in connection with block 512 to cause the log to be presented as a node in a map. The map can visually indicate a log status of the log based on the potential abnormality and the volume of user activity. For example, the nodes of a map can represent logs and be colored based on potential abnormality, the log template, the correlation, and/or the volume of user activity associated with each log. The visual indications can be binary or show a degree of abnormality. For example, a node can be colored green to indicate a log has no potential abnormality, orange to indicate the log has a potential abnormality that can be explained by the volume of user activity, and red to indicate the log has a potential abnormality that cannot be explained by the volume of user activity.

FIG. 6 includes blocks similar to blocks of FIG. 5 and provides additional blocks and details. In particular, FIG. 6 depicts additional blocks and details generally regarding monitoring user activity, making determinations based on the log and/or the user activity, and providing a status of the log.

At block 602, user activity of the computer system is monitored. The volume of user activity can be calculated based on the number of real users utilizing the computer system at any given time. The volume of user activity can be continuously monitored or calculated upon request based on statistics monitored by various tools.

At block 604, a determination as to whether a log analysis was requested is made. Once a log analysis is requested, the information regarding the log and the volume of user activity can be retrieved. In addition, as shown at block 606, a plurality of templates and a seasonal effect on the log are identified. The plurality of templates and the seasonal effect can be used to generate the baseline, at block 608. The volume of user activity can be used to adjust the baseline as well.

At block 610, the log is compared to the baseline. The log and the baseline can be converted to graphs and compared to identify differences and infer abnormalities. At block 612, a determination as to whether an abnormality exists is made. The differences between the graphs can be used to identify abnormalities. If no abnormality exists, then the log status can be immediately determined as not containing an abnormality, or otherwise healthy. If an abnormality does exist, the user activity volume is determined at block 614. The user activity volume can be retrieved or calculated based on the data associated with the monitored user activity.

At block 616, the user activity volume is compared to the abnormality. For example, the degree of abnormality can be compared to the degree of the user activity volume at the time stamp of the abnormality. At block 618, a determination is made as to whether the abnormality corresponds to user activity. The block 618 can also comprise at least one of identifying the log is impacted by the volume of user activity and identifying the user activity impacts a log. The information regarding the correlation between user activity and individual logs can be useful in determining the severity the abnormality and assist future abnormality determinations.

At block 620, a degree of abnormality is determined based on the volume of user activity and can be provided for visually indication at block 626. The degree of abnormality can adjust in accordance with a correlation between the user activity volume and the abnormality. For example, the degree of abnormality can drop to no abnormality or low abnormality if the abnormality strongly correlates to the volume of user activity. Similarly, if the abnormality does not correspond to user activity, then the degree of abnormality can adjust accordingly. For example, if the user activity volume graph decreased at the time the log graph increased, then this can indicate a high degree of abnormality. The volume of the log activity can be estimated based on a degree of granularity. For example, the volume of log activity can be estimated for each user or for each transaction, depending on the selected level of granularity.

At block 622, a log status is determined. The log status can represent the existence of the abnormality and/or the classification of the log based on the correlation between the log activity and the user activity volume, such as the log score based on the degree of abnormality. At block 624, a map with a node associated with the log is created. A map can include hundreds of logs and the log status of each log can be visually indicated, at block 626. A graphical representation of the health of the logs can ease the labor utilized in determining which logs contain a relevant abnormality.

Although the flow diagrams of FIGS. 4-6 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present invention.

The present description has been shown and described with reference to the foregoing examples. It is understood, however, that other forms, details, and examples can be made without departing from the spirit and scope of the invention that is defined in the following claims.

What is claimed is:

1. A log analysis system comprising:
   a processor; and
   a memory to store instructions that, when executed by the processor, cause the processor to:
   monitor user activity of a computer system to determine historical log activity;
   monitor user activity of the computer system to determine a user activity volume by determining a number of multiple real users interacting with the computer system, wherein the user activity volume corresponds to the number of multiple real users;
   generate an expected baseline of a log based on the historical log activity, wherein the log comprises event messages describing states experienced by the computer system;
   compare the log to the expected baseline to identify an abnormality;
   compare the abnormality to the user activity volume based on a correlation between the user activity volume and the historical log activity;
   generate a degree of the abnormality based on a context of the log, wherein the context of the log includes the correlation, and the correlation is based on a degree of user activity volume on the log; and
   classify the log based on the abnormality, the correlation, the user activity volume, and the degree of the abnormality.

2. The log analysis system of claim 1, wherein the instructions, when executed by the processor, cause the processor to:
   adjust the expected baseline based on the user activity volume; and
   compare the log to the adjusted expected baseline.

3. The log analysis system of claim 1, wherein the instructions, when executed by the processor, cause the processor to identify a log template based on a log entry of the log, wherein the expected baseline is based on a seasonal effect of the log and the log template.

4. The log analysis system of claim 3, wherein the instructions, when executed by the processor, cause the processor to:
   create a graph based on the log template, the graph to represent a number of log entries associated with the log template; and
   compare the graph to the expected baseline, the abnormality being the difference between the graph and the expected baseline.

5. The log analysis system of claim 1, wherein the instructions, when executed by the processor, cause the processor to cause a display of the abnormality and a classification of the log.

6. The log analysis system of claim 1, wherein the instructions, when executed by the processor, cause the processor to classify the log as having a relatively smaller degree of abnormality based on the user activity volume having a relatively larger correlation to the historical log activity and classify the log as having a relatively larger degree of abnormality in response to the user activity volume having a relatively smaller correlation to the historical log activity.

7. The log analysis system of claim 1, wherein the instructions, when executed by the processor, cause the processor to determine a number of the multiple real users interacting with the computer system by tracking at least one of requests and sources of the at least one of requests.

8. The log analysis system of claim 1, wherein the instructions, when executed by the processor, cause the processor to determine a first difference between a baseline graph and an actual log graph and to determine a second difference based on the user activity volume, wherein one of the first difference and the second difference is smaller than the other of the first difference and the second difference.

9. The log analysis system of claim 1, wherein an effect of the user activity volume is removed after the abnormality is identified.

10. A computer readable storage medium comprising a set of instructions executable by a processor resource to:
    generate a first graph, the first graph to represent an expected baseline of log activity of a log associated with a computer system based on a log template of the log activity and a seasonal effect of the log activity, wherein the log activity comprises activity represented by event messages that describe states experienced by a computer system and the log template represents a type of event message;
    generate a second graph, the second graph to represent a user activity volume of the computer system, wherein the user activity volume is determined by a number of multiple real users interacting with the computer system, wherein the user activity volume corresponds to the number of multiple real users;
    compare the first graph to the second graph to identify a correlation between the expected baseline and the user activity volume;
    identify an abnormality of the log activity based on the correlation and a difference between the first graph and the log activity;
    generate a degree of the abnormality based on a context of the log, wherein the context of the log includes the correlation, and the correlation is based on a degree of user activity volume on the log; and
    score the log activity based on the expected baseline of log activity, the correlation, the user activity volume, and the degree of the abnormality.

11. The medium of claim 10, wherein the expected baseline comprises:
    a degree of relatedness among log activity based on a text template; and
    wherein the seasonal effect is based on a time-dependent pattern of the log template.

12. The medium of claim 10, wherein the set of instructions executable to generate a second graph comprise instructions executable by the processor to:

monitor the user activity volume of the computer system; and wherein the set of instructions executable to generate a first graph comprise instructions executable by the processor to:
normalize the seasonal effect of the expected baseline based on the user activity volume; and
wherein the set of instructions to compare the first graph to the second graph includes using data provided by a real user monitor to determine the correlation between a user activity.

13. The medium of claim 10, wherein the set of instructions is executable by the processor to:
cause a display of the log activity with an identifier associated with the abnormality of the log activity and the score of the log activity.

14. The medium of claim 13, wherein the identifier indicates the degree of the abnormality based on the context of the log and a severity of the abnormality, the context of the log to include the correlation of the log based on the degree of user activity volume on the log.

15. The medium of claim 10, wherein the instructions are executable by the processor resource to cause the processor resource to score the log activity to represent the log activity having a relatively smaller degree of abnormality based on the user activity volume having a relatively larger correlation to the log activity and represent the log activity having a relatively larger degree of abnormality in response to the user activity volume having a relatively smaller correlation to the log activity.

16. A method comprising:
identifying a log template based on a set of entries of a log, wherein the log comprises event messages describing states experienced by a computer system and the log template represents a type of event message of the log;
generating a baseline graph associated with expected log activity based on the log template;
generating a user activity graph associated with a volume of user activity, wherein the volume of user activity is determined by a number of multiple real users interacting with the computer system, wherein the volume of user activity corresponds to the number of multiple real users;
comparing the user activity graph to the baseline graph to identify a correlation between the log template and the volume of user activity;
comparing a potential abnormality of the log to the volume of user activity associated with the log, the potential abnormality being a difference between the log and a baseline;
generating a degree of the potential abnormality based on a context of the log, wherein the context of the log includes the correlation, and the correlation is based on a degree of the volume of user activity on the log; and
visually indicating a status of the log based on a correlation between the potential abnormality and the volume of user activity.

17. The method of claim 16, comprising:
clustering a set of entries of the log based on a text template to identify the log template;
identifying a seasonal effect of the expected log activity; and
identifying a number of the set of entries associated with the log template.

18. The method of claim 17, comprising:
mapping a log template count of the log to a log graph based on a number of the set of entries associated with the log template;
comparing the log graph to the baseline to identify the potential abnormality; and
causing to present the log as a node in a map, the map to contain nodes having a color based on an abnormality associated with the log template and the correlation between the log template and the volume of user activity.

19. The method of claim 16, comprising at least one of:
identifying the log is impacted by the volume of user activity; and
identifying a user activity to impact the log.

20. The method of claim 16, comprising:
estimating a volume of log activity based on a degree of granularity; and
providing a degree of abnormality of the log based on the volume of user activity.

* * * * *